United States Patent
Berzin (10) Patent No.: US 6,290,361 B1
(45) Date of Patent: Sep. 18, 2001

(54) UNIVERSAL CLEARING AIR SYSTEM FOR WINDOWS AND EXTERNAL MIRRORS OF A VEHICLE

(76) Inventor: Leonid Berzin, 2954 W. 8th St., Apt. 15C, Brooklyn, NY (US) 11224

(*) Notice: Subject to any disclaimer, the term of this patent is extended or adjusted under 35 U.S.C. 154(b) by 0 days.

(21) Appl. No.: 09/702,639

(22) Filed: Nov. 1, 2000

(51) Int. Cl.$^7$ .............. G02B 5/08; B60R 1/06; B60S 1/54; B60S 1/56
(52) U.S. Cl. ............ 359/507; 359/509; 359/512; 454/124; 454/125; 15/250.003
(58) Field of Search .................. 359/507, 509, 359/512, 871, 872; 454/123, 124, 125; 15/250.003

(56) References Cited

U.S. PATENT DOCUMENTS

| | | | |
|---|---|---|---|
| 2,622,261 | * 12/1952 | Smith | 359/509 |
| 2,796,506 | * 6/1957 | Lumbert . | |
| 3,059,540 | * 10/1962 | Robinson . | |
| 3,455,624 | * 7/1969 | Godfrey . | |
| 3,859,899 | 1/1975 | Mills | 98/2 |
| 3,877,780 | 4/1975 | Taylor | 350/63 |
| 4,350,084 | 9/1982 | Azzola | 98/2 |
| 4,439,013 | 3/1984 | Hagn | 350/307 |
| 4,462,303 | 7/1984 | Gebhard | 98/2 |
| 4,561,732 | 12/1985 | Japes | 350/584 |
| 4,678,224 | 7/1987 | Geppert | 296/91 |
| 4,697,065 | * 9/1987 | Ishitsubo et al. . | |
| 4,786,188 | 11/1988 | Myhre | 374/125 |
| 4,836,669 | 6/1989 | O'Brien | 374/125 |
| 4,898,458 | 2/1990 | McDonald | 350/584 |
| 4,903,581 | 2/1990 | Nilsson | 98/2.04 |
| 4,963,011 | 10/1990 | Lu | 350/584 |
| 4,979,809 | 12/1990 | Peters | 350/584 |
| 4,981,072 | 1/1991 | Hanson | 98/2.04 |
| 5,097,563 | 3/1992 | Cowan | 15/313 |
| 5,140,719 | 8/1992 | Cowan | 15/313 |
| 5,179,470 | 1/1993 | Olson | 359/509 |
| 5,264,962 | * 11/1993 | Kho | 359/507 |
| 5,343,328 | 8/1994 | Chang | 359/507 |
| 5,383,054 | 1/1995 | Chang | 359/507 |
| 5,760,956 | 6/1998 | Maccan | 359/509 |
| 5,815,315 | 9/1998 | Garland | 359/509 |
| 5,868,867 | 2/1999 | Clukey | 134/37 |
| 5,903,389 | 5/1999 | Rumez | 359/509 |
| 5,953,158 | 9/1999 | Kamakura | 359/509 |
| 6,012,817 | 1/2000 | Kamakura | 359/509 |

FOREIGN PATENT DOCUMENTS

| | | | |
|---|---|---|---|
| 2 262 441 A | 6/1993 | (GB) | A47G/1/02 |
| 56-163931 | * 12/1981 | (JP) | 359/509 |
| 57-151411 | * 9/1982 | (JP) | 359/509 |
| 1-269636 | * 10/1989 | (JP) | 359/509 |
| 6-65126 | * 9/1994 | (JP) | 359/509 |
| 10-250534 | * 9/1998 | (JP) | 359/509 |
| WO 88/00142 | 1/1988 | (WO) | B60R/1/06 |

* cited by examiner

Primary Examiner—Ricky D. Shafer
(74) Attorney, Agent, or Firm—Boris Leschinsky (57) ABSTRACT

A clearing system for external mirrors and side windows of a vehicle provides a flow of compressed warm air to an air distribution unit equipped with a number of openings to direct the flow of air towards the surface of the mirror or a side window. In one embodiment, the air compressor, the air heater and an optional air filter are located in the housing of the external mirror. In another embodiment, a supplemental air distribution unit is provided to be mounted along the door of the vehicle to increase the coverage area of the side window. In a further embodiment of the invention, the system is made adjustable for allowing the most appropriate angle for the air openings towards the mirror and the side window. Provisions are also made to use the system for newly designed vehicles and incorporate the elements of the system into the design of the vehicle door. Alternately, an add-on elements are described to allow existing vehicles to benefit from the system. Additional supplemental air disribution units may be attached to the main system to improve visibility throughout the vehicle.

9 Claims, 7 Drawing Sheets

UNIVERSAL CLEARING AIR SYSTEM FOR WINDOWS AND EXTERNAL MIRRORS OF A VEHICLE

BACKGROUND OF THE INVENTION

1. Field of the Invention

This invention relates to a system for cleaning and clearing windows and external rear view mirrors of a vehicle and particularly to a system which provides conditioned ventilation to the exterior mirrors and windows of a motor vehicle. The invention may be used for a variety of moving transportation means such as cars, trucks, all-terrain vehicles, trains, ships, etc.

2. Description of the Prior Art

The accumulation of dirt and/or precipitation on the exterior of side windows of a motor vehicle is a common problem for operators of motor vehicles. This accumulation prevents and obstructs the operator's visibility to the periphery and more importantly, the ability to see in the exterior rear view mirror any traffic approaching in the adjoining lane. Moisture will collect on the viewing surface of exterior rearview mirrors during times of precipitation. This condition has the ability to distort the reflective properties of images viewed therein. This situation is further compounded during periods of darkness when the reflection of headlights upon the moisture covered rearview mirror creates additional visual distortion to images viewed therein.

Various improvements have been made to exterior rearview mirrors including but not limited to: remote movement mechanisms (e.g. mechanical means to move mirrors from inside an automobile with the windows up), reduced glare viewing surfaces and structural housings designed to improve the aerodynamics of air flow around the circumference of the mirror, and mechanical wiper assemblies.

A number of solutions have been proposed in the prior art to solve the problem of clearing the rear view mirrors from dirt and water condensate. They can be generally combined into two groups: passive air deflectors and active air blowers. The first group consists of a variety of simple and inexpensive "add-on" devices aimed at collecting the incoming air during the movement of a vehicle and projecting it onto the surface of the rear view mirror. For example, a U.S. Pat. No. 3,598,469 was granted to Mr. William J. Landen on Aug. 10, 1971. Through the use of air pressure gradients resulting from the forward motion of a motor vehicle, moisture would be removed from the viewing surface of an exterior rearview mirror. Other examples of such passive air deflectors may be found in the following U.S. Pat. Nos. 5,868,867; 5,815,315; 5,760,956; 5,343,328; 5,179,470; 4,979,809; 4,963,011; 4,903,581; 4,898,458; and 4,869,581. These devices have the advantage of being reasonably universal so as to be usable for a number of vehicles. They also work in a satisfactory way during a high speed movement of a vehicle. However, at low speeds (which is most likely in bad weather conditions!) or when the vehicle is not moving at all, these devices lose their ability to provide air flow. Also, they are inherently incapable of conditioning the air flow such as to increase its temperature or reduce humidity, all of which may be helpful in extreme weather conditions.

The use of various active air blowers provide improved effectiveness of these systems by removing their dependency of the speed of the vehicle and by allowing some air conditioning to occur. Another advantage of these systems is that they allow the clearing of the side windows as well as the rear mirrors. At the same time, these systems are complex and hence vehicle-specific. They assume incorporation of unique design elements with the on-board air-system of a vehicle and can not be easily adapted to be used for a variety of different vehicles. In addition, in many cases the air blowers are underpowered and blow the air at an acute angle towards the surface of the mirror so that the incoming moist and cold air flow simply overwhelms their function.

Examples of such devices can be found in the following U.S. Pat. Nos. 6,012,817; 5,953,158; 5,903,389; 5,383,054; 4,981,072; 4,561,732; 4,462,303; 4,439,013; 4,350,084; 3,877,780; 3,859,899; as well as in a PCT application No. WO 88/00142 and a UK application No. 2,262,441A.

Another limitation of the prior art devices is in the way the air flow is often organized. Typically, a narrow long passage opening is present in the devices of the prior art and the air is emitted therethrough does not provide for optimal coverage of the surface of the mirror or a side window.

Therefore, the need exists for a universal system for maximal clearing of the rear view external mirrors and the side windows of a vehicle which is free from the above mentioned drawbacks.

SUMMARY OF THE INVENTION

Accordingly, it is an object of the present invention to overcome these and other drawbacks of the prior art by providing a novel clearing system for a vehicle capable of providing improved visibility for the windows and the external rear view mirrors of that vehicle in a variety of weather conditions (such as rain, snow, and ice) and at various speeds of movement including a complete stop.

It is another object of the invention to provide a clearing system capable of uniform clearing of the entire surface of an external mirror or a window by covering it with a flow of air equally spread over that surface.

It is another object of the invention to provide a universal clearing system for rear view external mirrors and windows of a vehicle capable of blowing preconditioned air onto the surface of the widows and mirrors to be cleared.

It is yet another object of the invention to provide a clearing system with main components being small enough to be capable of fitting inside the cavity awarded by the external mirror housing.

It is yet another object of the present invention to provide a clearing system for external mirrors and windows of a vehicle capable of being mounted universally as an "add-on" component onto a variety of existing vehicles having mirrors and windows of different designs and sizes.

It is a further object of the invention to provide a clearing system for external mirrors and windows of a vehicle capable of having its air blower nozzles position being adjusted to maximize the clearing effect.

The clearing system of the invention generally consists of a source of compressed air connected to an optional but highly preferred air conditioning unit, typically an electrical heater. In one embodiment, both the air compressor and the air heater are located in a cavity awarded by a mirror housing in order to minimize the dimensions of the system. An optional air filter may also be included in the air conditioning unit to prevent any debris from being blown onto a mirror surface. In turn, an air conditioning unit is connected to an air flow distribution unit. It is this unit which mostly comprises the essence of the invention. It is equipped with a number of closely located openings each designed to optimize the individual air flow so that the surface coverage is optimally organized. In operation, the air is compressed and heated up in the first two units of the device and then the air is distributed through the uniquely designed openings of the air distribution system to provide a full coverage clearing function for the outside surface of the side window or a rear view mirror of a vehicle. In additional embodiments of the invention, adjustable air nozzles are provided to ensure the clearing of a side window independently of the rear view mirror, as well as provisions for mounting the system onto existing vehicle mirrors. The system of the present invention is especially easy to mount onto vehicles equipped with power mirrors.

For a better understanding of the invention, its operating advantages and the specific objects attained by its uses, reference should be made to the accompanying drawings and descriptive matter in which there is illustrated a preferred embodiment of the present invention.

BRIEF DESCRIPTION OF THE DRAWINGS

A more complete appreciation of the subject matter of the present invention and the various advantages thereof can be realized by reference to the following detailed description in which reference is made to the accompanying drawing in which.

DETAILED DESCRIPTION OF THE FIRST MOST PREFERRED EMBODIMENT OF THE INVENTION

Figure 1:
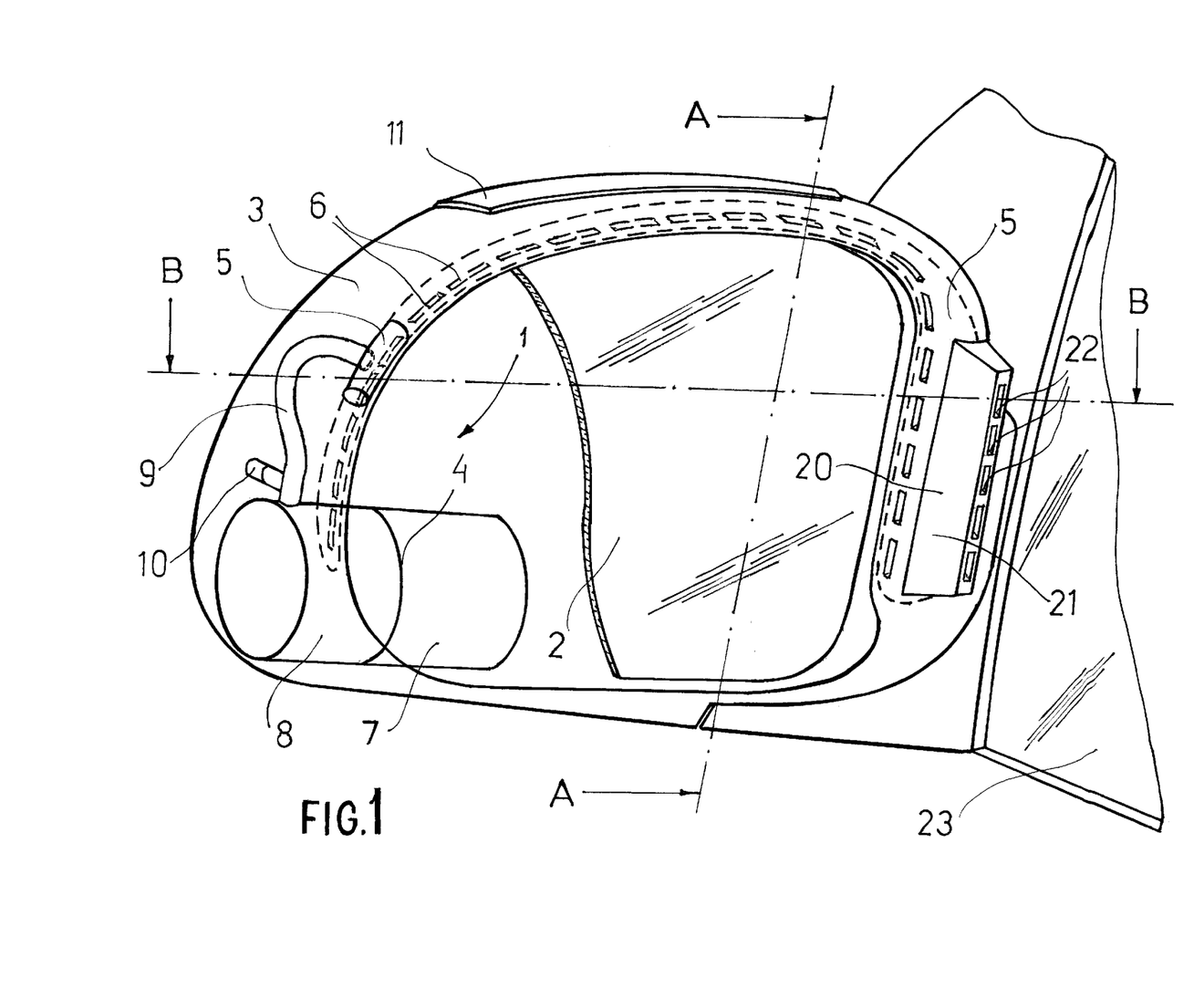
FIG. 1 is a general schematic view of the main components of the invention according to the first embodiment including a mirror distribution unit and a side window distribution unit.
Figure 2:
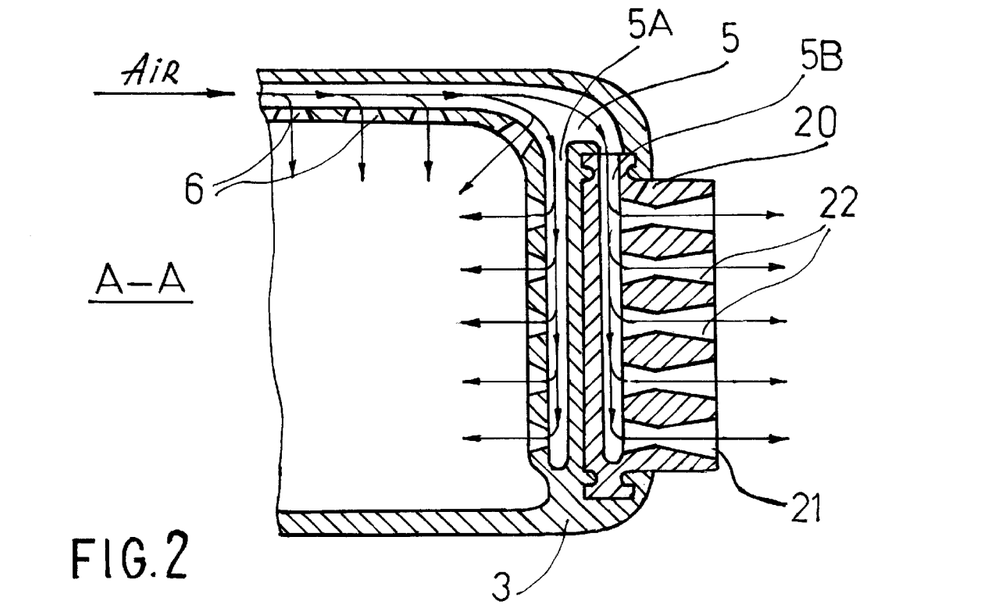
FIG. 2 is a cross-sectional view A—A of the system on FIG. 1 (the side window air distribution unit is shown turned into the same plane as the mirror air distribution system for clarity of illustration)
Figure 3:
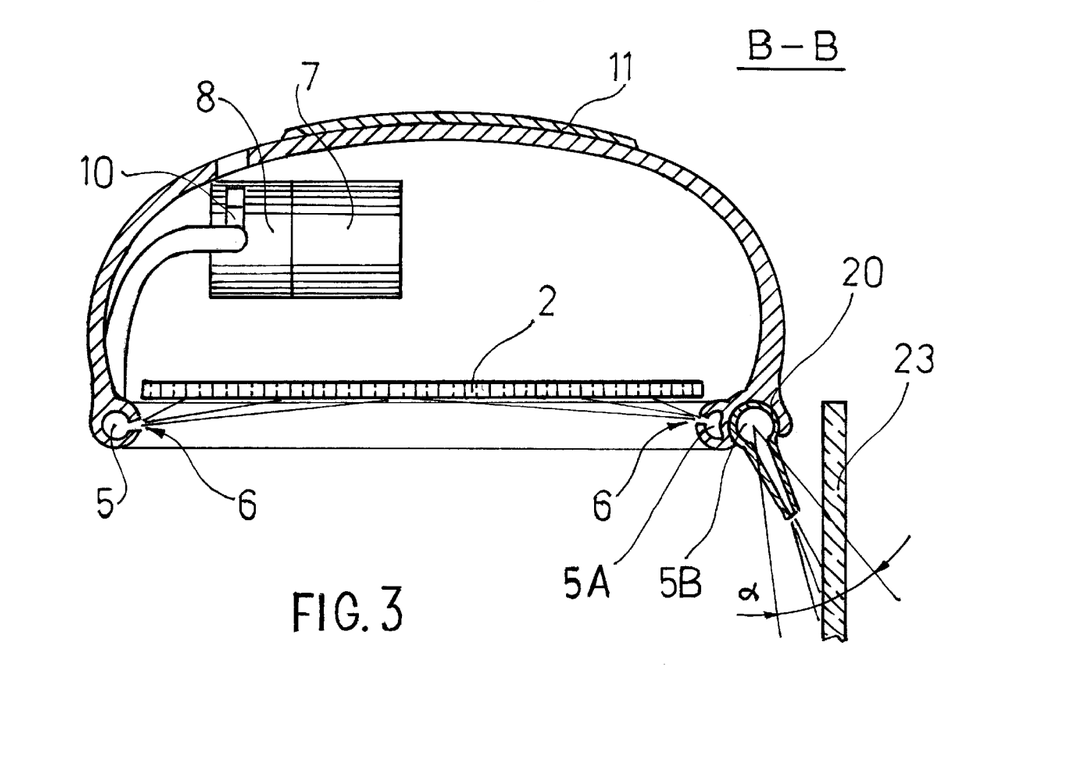
FIG. 3 is a cross-sectional view B—B of the system on FIG. 1.

A detailed description of the first most preferred embodiment of the present invention follows with reference to accompanying drawings on FIGS. 1–3 in which like elements are indicated by like reference numerals. The first embodiment contains all the basic elements of the invention.

According to the first embodiment of the present invention, the universal clearing system for mirrors and side windows (1) consists of the air preparation unit (4) and the air distribution unit (5). All power elements of the system (1) are located inside the cavity awarded by the housing (3) and behind the rear view mirror (2). The air preparation unit (4) consists of an air compressor (7) connected to an air conditioning unit (8), typically an electrical air heater. A high pressure minicompressor or, alternately, a high speed air turbine may be used as the air compressor (7). The unit (7) takes ambient air from the space surrounding the system (1). In case of a small mirror housing (3), a portion of the air blown onto the surface of the mirror (2) will be recirculated back into the inlet of the unit (7) further increasing its efficiency. Alternate uses of the compressed air generated by the unit (7) may include adding of compressed air into the tires of the wheels of the vehicle or powering an air-driven accessory such as an air spray gun for body repair painting work. To aid in connecting the unit (4) to the outside accessory, a universal connector (10) is added close to its outlet. The air conditioning unit (8) may be designed using a commonly known air heaters such as for example a heater based on a hot wire connected to the electrical supply system of the vehicle. An optional filter may also be added (not shown) to the outlet of the unit (8) or preferably to the inlet of the unit (7) to prevent blowing of any debris onto the surface of the mirror (2). The universal connector (10) may also be used for attaching an additional air distribution unit (not shown). The air preparation unit (4) is capable of supplying warm air in a continuous or pulsatile flow mode. Continuous flow is preferred during a rainy or foggy weather conditions while pulsatile flow is especially beneficial for removal of snow, mud, and alike. An optional switch is envisioned allowing the driver to choose the best mode of operation of the unit (4).

The outlet of the air preparation unit (4) is connected via an air line (9) to the air distribution unit (5). The air distribution unit (5) contains a number of air openings (6) positioned in the housing (3) along the upper and the side portions of the mirror (2). To ensure the most effective removal of elements from the surface of the mirror (2), the air openings (6) are designed to blow a plurality of air flows from the sides and from the top of the mirror (2) and at a preferred angle of between 15 and 30 degrees to the mirror surface. It is essential to position the air openings (6) as close as possible to each other and in a linear configuration along the edge of the mirror. The presence of a plurality of these air openings as opposed to a single long and narrow opening described in the prior art allows for a better defined air flow distribution and coverage of the surface to be cleared. According to the invention, the shape of the air openings shown on FIGS. 1–3 is designed to direct all individual air flows towards the center of the mirror (2). At the same, it awards a further optimization opportunity to direct each air flow individually. One possibility (not shown on the drawing) is to alternate the direction of the air flows between adjacent air openings (6) between the direction towards the center of the mirror (2) and the direction towards the closest edge of the mirror. That way, a more complete clearing may be achieved so that the entire surface of the mirror is available for use by the driver of the vehicle. This design has substantial advantages for larger mirrors such as in heavy trucks.

Although FIGS. 1–3 show the air distribution unit (5) mounted on the housing (3), it is also envisioned that alternately it may be mounted directly on the edge of the mirror so that the air flow direction is not changed significantly during the adjustment of the mirror position by the driver.

A weather sensor (11) is optionally mounted on the upper outside surface of the housing (3) and is designed to trigger the system to turn on automatically in case a rain or snow conditions are detected. A well known moisture sensors may be used for that purpose.

The air distribution unit (5) is divided into an air channel (5A) and air channel (5B) along the vehicle side of the housing (3). The air channel (5A) is designed to clear the corresponding portion of the mirror (2) while the air channel (5B) supplies air to the rotatable air manifold (20) to clear the portion of the side window of the vehicle (23) next to the mirror housing (3). FIG. 3 shows the air manifold (20) which consists of a manifold housing (21) capable of rotating in the range of the angle α of about 45 degrees in the general direction towards the side window (23). The manifold housing (21) includes a number of individual air nozzles (22) directing air flow towards the window (23). They may be designed in a variety of ways similar to the air openings (6) in addition to what is shown on FIG. 2 as a number of generally parallel openings. One advantageous design would include an alternating of air flow directions to maximize the coverage area for clearing of the side window of a vehicle (not shown).

In operation, the air compressor (7) provides a compressed air and forces it into the air conditioning unit (8) for heating and optional filtering. Warm air then is forced into the air distribution unit (5) through the line (9). A number of individual air flows is organized in the air openings (6) and are directed towards the surface of the mirror (2) for clearing it from water, snow, and alike. At the same time, some portion of warm air is diverted into the channel (5B) and is used for blowing against the side window (23) for clearing it at the same time as the mirror (2).

The invention may be used for a driver side mirror and side window or preferably for both the driver and the passenger sides for better safety of driving a vehicle.

DETAILED DESCRIPTION OF THE SECOND EMBODIMENT OF THE INVENTION

Figures 4, 5:
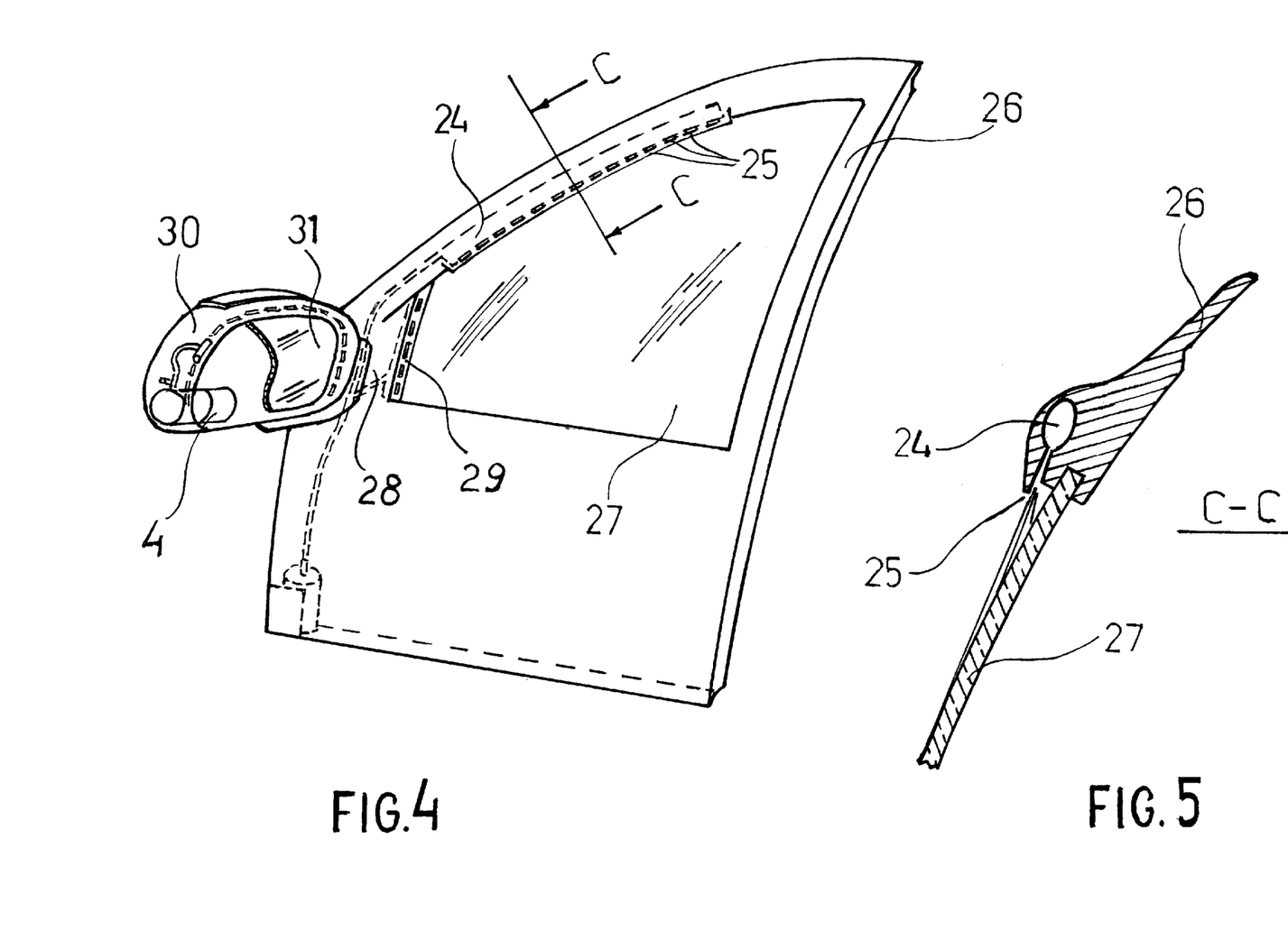
FIG. 4 is general view of the second embodiment of the invention having an additional door-mounted air distribution unit for clearing the larger area of the side window.
FIG. 5 is a cross-sectional view C—C of the system shown on FIG. 4.

FIGS. 4 and 5 depict the second embodiment of the present invention in which in addition to all the elements of the invention described in the first embodiment a supplemental air distribution unit (24) with a number of air openings (25) is designed to be located along an edge of the door (26). Of course, it can only be applicable to newly designed vehicles as a change in a door design is required. The advantage of this design is that the side window is cleared in a much more complete way by having air jets directed from the front and upper portions of the door towards the lower side of the window.

Another variation shown on FIGS. 4 and 5 is that as long as the door design is altered, the opportunity arises to include the side window channels into the front wedge portion of the door. In other words, the air supply channels described as (5A) for the first embodiment are incorporated into the door (26) as an air manifold (28) with air openings (29) directed towards the window (27) in a similar way as in the first embodiment. This more streamlined design is advantageous for vehicles requiring best esthetics such as a passenger car although may also be used for other vehicles. The air supply system (4) is also located inside the mirror housing (30) behind the mirror (31) or alternately in the lower portion of the vehicle door (shown in dashed lines). It is advantageous to place the system components in the mirror rather than in the door housing so that less noise and vibration are transmitted into the passenger compartment.

DETAILED DESCRIPTION OF THE THIRD EMBODIMENT OF THE INVENTION

Figures 6, 7, 8:
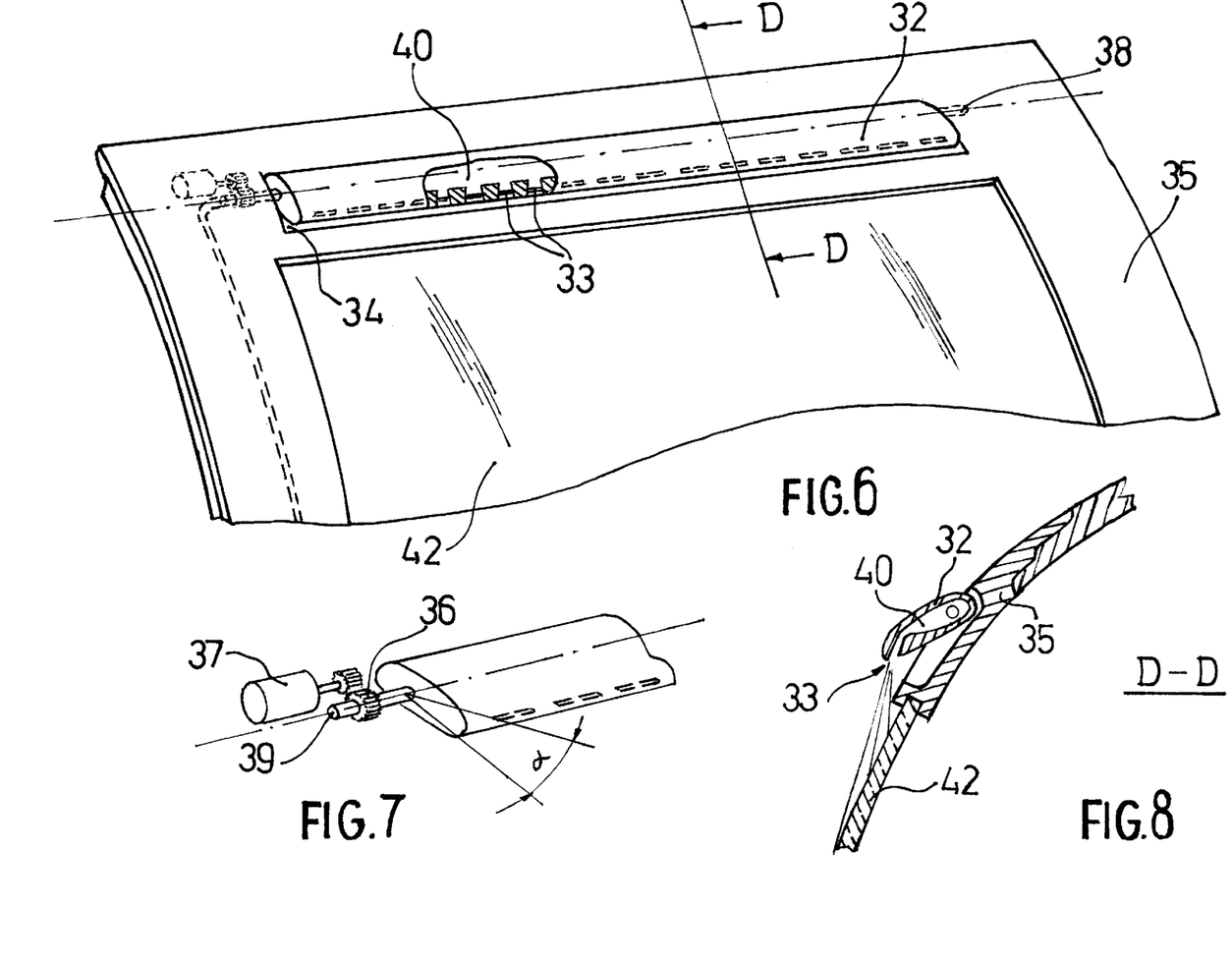
FIG. 6 is view of the third embodiment of the invention including a rotatable air distribution unit mounted along the side window of a vehicle.
FIG. 7 is general view of the unit from FIG. 6.
FIG. 8 is a cross-sectional view D—D of the unit shown on FIG. 6.

FIGS. 6, 7, and 8 illustrate the third embodiment of the invention. They depict a rotatable variation of the supplemental air distribution unit (32) equipped with a plurality of air openings (33) designed in a way similar to the first and second embodiment of the invention. The air unit (32) is placed in the recess (34) of the front and upper portion of the vehicle door (35). The rotatable air distribution unit (32) is powered by a drive system including an electrical motor (37) and a gear train (36) driving the unit (32) about the axis (38). The gear train (36) is located in the cavity (39) which is also used to supply compressed air into the air unit (32) by air supply channel (40). As in the previous embodiments, the air compressor may be placed in the lower portion of the door (35).

The electrical motor (37) is capable to rotate the air distribution unit (32) withing the range of the angle α of about 45 degrees in the general direction towards the side window (42). Two modes of operation are envisioned for the motor (37). In the first mode, it is used to simply adjust the angle α of the unit (32) occasionally for better clearing of the side window. In the second mode, it is designed to constantly vary the angle α of the unit (32) in a reciprocal motion to cover the most area of the window (42). An appropriate switch is placed in the passenger compartment to control the function of the motor (37).

The third embodiment assumes a dedicated design of the door to incorporate the elements of the system in a similar way as the second embodiment of the invention.

DETAILED DESCRIPTION OF THE FOURTH EMBODIMENT OF THE INVENTION

Figure 9:
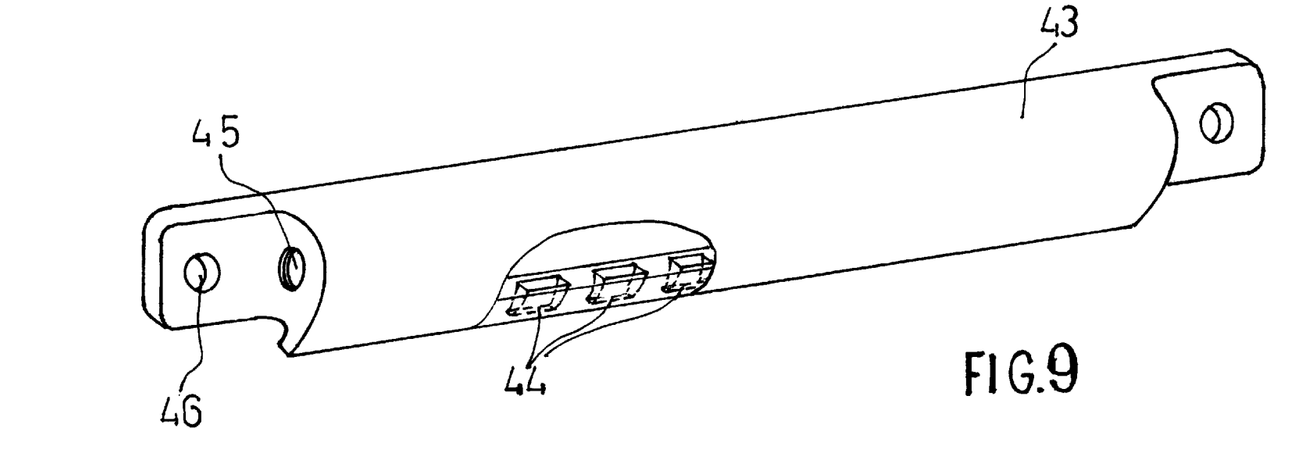
FIG. 9 is a general view of an add-on stationary air distribution unit according to the fourth embodiment of the invention.
Figure 10:
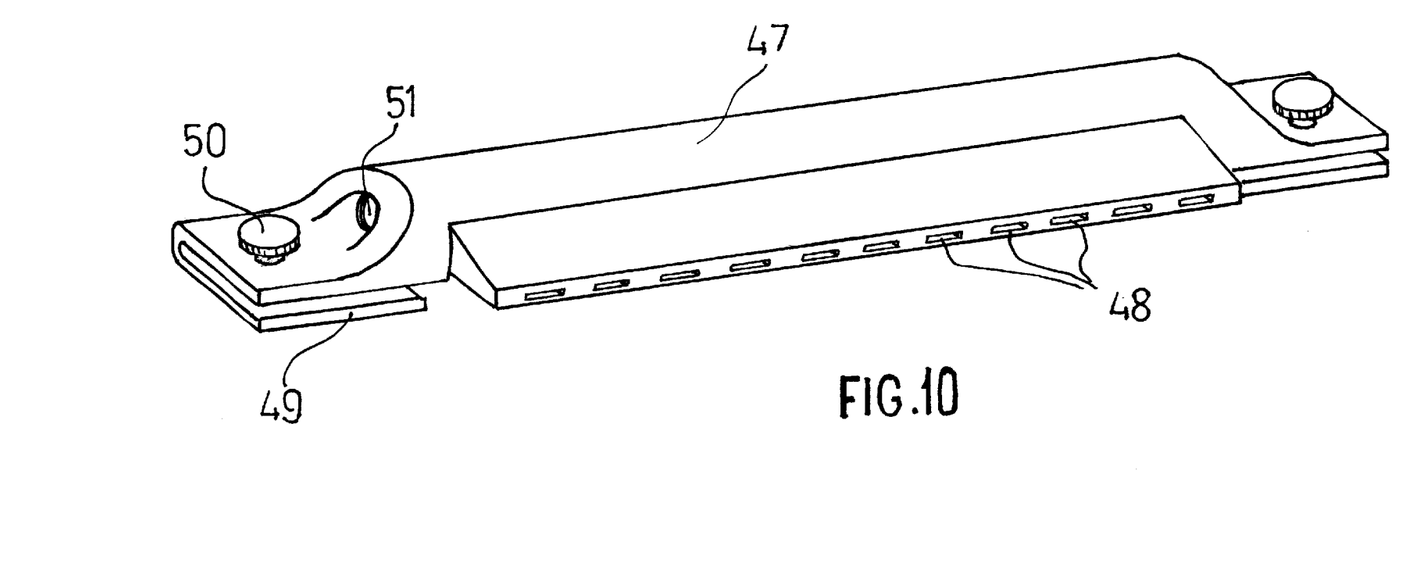
FIG. 10 is a general view of an add-on adjustable air distribution unit designed to be mounted on a vehicle door.

The fourth embodiment is shown on FIGS. 9 and 10 and is designed as an add-on component for an existing vehicle without a need to change the design of the door.

FIG. 9 shows a supplemental air distribution unit (43) equipped with a number of air openings (44) designed in a way similar to that described above. It allows a stationary placement in the upper and front section of the door of a vehicle by mounting holes (46). A connector opening (45) is located in the unit (43) and is designed to accept an air supply pipe routed from the air preparation unit towards the supplemental unit (43) on the outside of the vehicle door. This version of the add-on supplemental system is particularly useful for application on trucks and other heavy vehicles. Air supply can alternately by provided by tapping into an existing compressed air system of a vehicle if available.

FIG. 10 depicts an adjustable supplemental air distribution unit (47) equipped with a number of air openings (48). It is made as an add-on unit which is easily removable and can be repositioned if needed by having two slots (49) and corresponding hand tightening screws (50). These elements are designed to allow the placement of the unit (47) over the edge of the door of a vehicle or, alternately directly over the edge of the glass of a side window. Air connector (51) is capable of accepting the air supply in the same way as shown on FIG. 9. Manual adjustment of the position of the air openings (48) can be achieved by rotating the unit withing the angle α of about 45 degrees in the general direction towards the side window.

DETAILED DESCRIPTION OF THE FIFTH EMBODIMENT OF THE INVENTION

Figure 11:
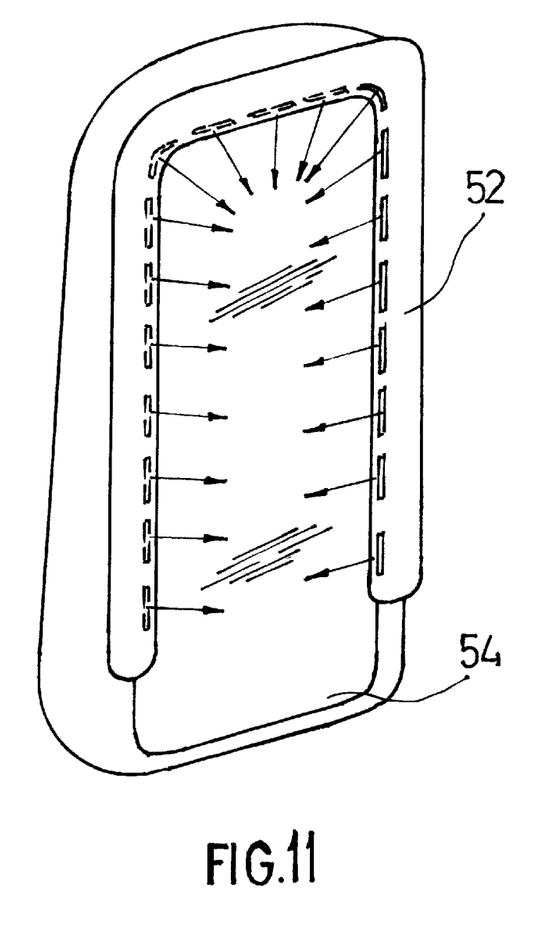
FIGS. 11 and 12 are general views of a an add-on air distribution systems according to the fifth embodiment of the invention designed to be mounted on existing rear-view mirrors.
Figure 12:
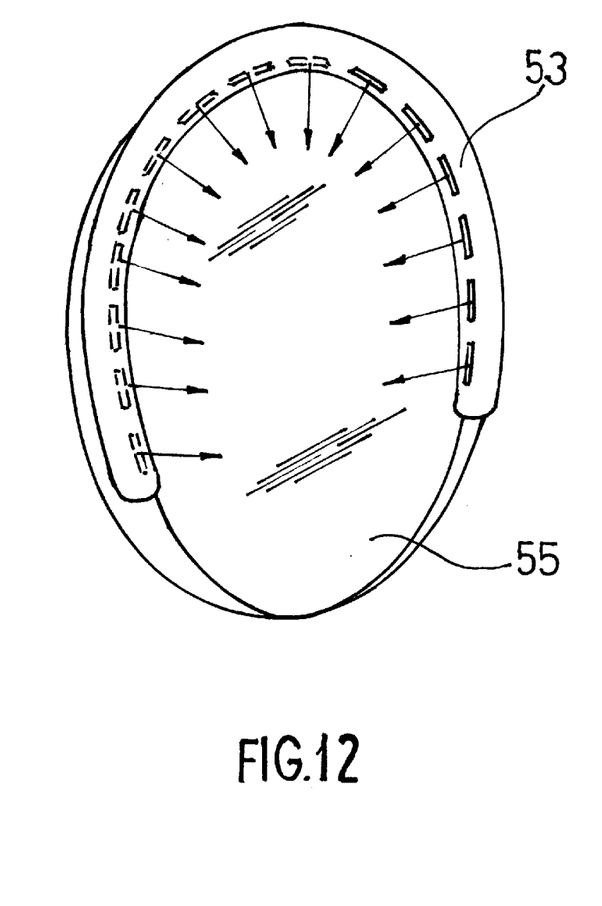

FIGS. 11 and 12 illustrate yet another embodiment of the invention. In addition to all the basic elements of the air clearing system described above, the fifth embodiment includes a flexible clip-on air distribution channel attached pneumatically to the air distribution unit and made out of soft polymer in such a way that it can assume the shape of the preexisting mirror. FIG. 11 shows the rectangular shape of the unit (52) mounted over a respective edge of the mirror (54) while FIG. 12 shows the same unit but in an oval shape (53) mounted over the respective mirror (55). Arrows indicate the general direction of the individual air flows from the upper and side portions of the mirror towards the center and generally down so that the elements may be removed effectively.

DETAILED DESCRIPTION OF THE SIXTH EMBODIMENT OF THE INVENTION

Figure 13:
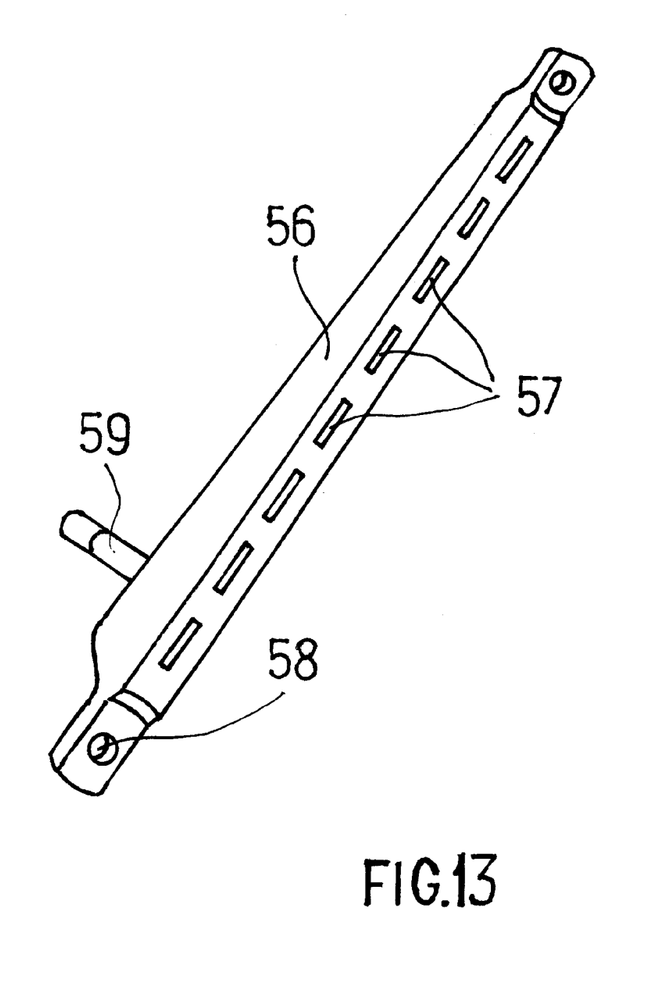
FIG. 13 is a supplemental air distribution unit according to the sixth embodiment of the invention.

Finally, FIG. 13 illustrate a supplemental air distribution unit (56) with a number of air openings (57) designed for a general use throughout the vehicle according to the sixth embodiment of the instant invention. It is equipped with a air connector (59) to supply compressed air and a set of mounting holes (58). A plurality of units (56) may be used not only for clearing of the side windows of a vehicles but also for a rear window or other appropriate surfaces.

Figure 14:
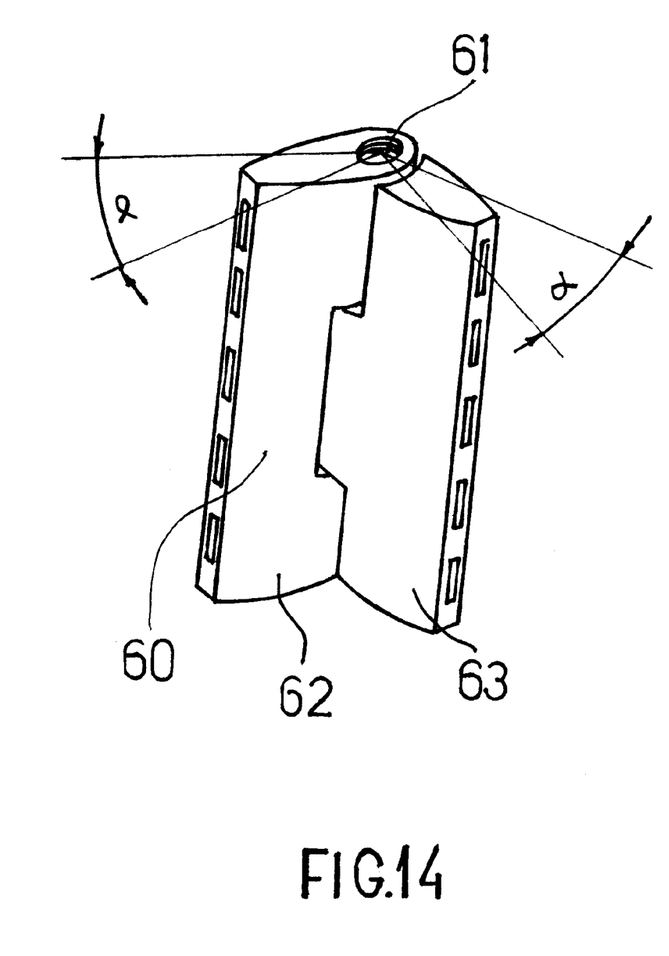
FIG. 14 is a supplemental adjustable air distribution unit of the invention.

FIG. 14 shows a similar universal supplemental air distribution unit (60) which is made adjustable with two air manifolds (62) and (63) rotatable about the axis (61) in the range of the angle α of about 45 degrees each. Appropriate mounting hardware is envisioned but is not showed on the drawing. This unit is useful as a simple add-on for simultaneous clearing of the side mirror and the side window of a vehicle.

Although the present invention has been described with respect to a specific embodiment and application, it is not limited thereto. Numerous variations and modifications readily will be appreciated by those skilled in the art and are intended to be included within the scope of the present invention, which is recited in the following claims.

What I claim is:

1. An air clearing system for an external mirror mounted near a side window of a vehicle, said system comprising:

an air preparation unit having an air compressor connected to an air conditioner for providing pulsatile flow of compressed warm air, and an air distribution unit for directing said pulsatile flow of compressed warm air through a plurality of air openings onto said external mirror, said air openings located in close proximity to one another and along the upper and side portions of said mirror, said air distribution unit also distributing said pulsatile flow of compressed warm air through an air manifold having a plurality of air nozzles directed towards a portion of said side window next to said external mirror.

2. The air clearing system as in claim 1, wherein said air openings are oriented within said air distribution unit at alternating angles to selectively provide individual air flows towards a center and a periphery of said external mirror.

3. An air clearing system for an external mirror mounted near a side window of a vehicle, said system comprising:

an air preparation unit having an air compressor connected to an air conditioner for providing compressed warm air, an air distribution unit for directing said compressed warm air through a plurality of air openings onto said external mirror, said air openings located in close proximity to one another and along the upper and side portions of said mirror, said air distribution unit also distributing said compressed warm air through a first air manifold having a plurality of air nozzles directed towards a portion of said side window next to said external mirror, and a supplemental air distribution unit placed along a front and upper edge of a door of said vehicle, said supplemental air distribution unit comprising a second air manifold having a plurality of air openings for directing said compressed warm air towards said side window.

4. The air clearing system as in claim 3, wherein said supplemental air distribution unit is rotatably placed in a recess in said door, said supplemental air distribution unit further comprising a drive system for rotating thereof to change the direction of said air openings towards said side window.

5. The air clearing system as in claim 4, wherein said drive system is controlled to reciprocally move said supplemental air distribution unit on a continuous basis to widen the area of coverage of said side window by said clearing system.

6. An air clearing system for an external mirror mounted near a side window of a vehicle, said system comprising:

an air preparation unit having an air compressor connected to an air conditioner for providing compressed air, an air distribution unit for directing said compressed air through a plurality of air openings onto said external mirror, said air distribution unit also distributing said compressed air through a first air manifold having a plurality of air nozzles directed towards a portion of said side window next to said external mirror, and an "add-on" supplemental air distribution unit comprising a mounting system including a pair of slots and corresponding hand tightening screws for mounting thereof along a front and upper edge of said door, said "add-on" supplemental unit also including a second air manifold having a plurality of air openings for directing said compressed air towards said side window.

7. The air clearing system as in claim 6, wherein said second air manifold rotatably mounted in said supplemental air distribution unit to allow the direction of said air openings towards said side window to be adjusted.

8. The air clearing system as in claim 6, wherein said "add-on" supplemental air distribution unit further comprising two additional air manifolds rotatably mounted along said door of said vehicle between said mirror and said side window, each of said additional manifolds having a plurality of air openings, each of said additional manifolds being individually adjustable to change the direction of said openings correspondingly towards said mirror and said side window.

9. An air clearing system as in claim 6, wherein said first air manifold comprising a flexible "clip-on" channel with a plurality of air openings, said channel mounted along an edge of said mirror.

* * * * *